US007944358B2

(12) United States Patent
Sorensen et al.

(10) Patent No.: US 7,944,358 B2
(45) Date of Patent: May 17, 2011

(54) TRAFFIC AND POPULATION COUNTING DEVICE SYSTEM AND METHOD (75) Inventors: Herb Sorensen, Troutdale, OR (US); David Albers, Gresham, OR (US)

(73) Assignee: Shopper Scientist, LLC, Corbett, OR (US)

( * ) Notice: Subject to any disclaimer, the term of this patent is extended or adjusted under 35 U.S.C. 154(b) by 278 days.

(21) Appl. No.: 12/135,072

(22) Filed: Jun. 6, 2008

(65) Prior Publication Data
US 2008/0303662 A1 Dec. 11, 2008

Related U.S. Application Data (60) Provisional application No. 60/942,652, filed on Jun. 7, 2007.

(51) Int. Cl.
*G08B 23/00* (2006.01)
(52) U.S. Cl. ............. 340/573.1; 340/539.13; 340/545.1; 377/6; 705/10
(58) Field of Classification Search ............. 340/539.13, 340/541, 573.1; 235/382, 385; 705/7–10, 705/23; 377/6; 701/207
See application file for complete search history.

(56) References Cited

U.S. PATENT DOCUMENTS

| 5,138,638 | A | * | 8/1992 | Frey | .................................. | 377/6 |
| 5,465,115 | A | * | 11/1995 | Conrad et al. | ................. | 348/155 |
| 5,524,129 | A | | 6/1996 | Pettigrew et al. | | |
| 5,946,368 | A | * | 8/1999 | Beezley | ............................ | 377/6 |
| 5,971,605 | A | * | 10/1999 | Aoki et al. | ....................... | 368/89 |
| 7,688,212 | B2 | * | 3/2010 | Farley | ........................ | 340/573.1 |
| 2001/0032353 | A1 | * | 10/2001 | Contadini et al. | ................ | 4/222 |
| 2004/0111454 | A1 | | 6/2004 | Sorensen | | |
| 2004/0238628 | A1 | | 12/2004 | Clark et al. | | |
| 2006/0010030 | A1 | | 1/2006 | Sorensen | | |
| 2006/0067456 | A1 | | 3/2006 | Ku et al. | | |
| 2006/0087474 | A1 | | 4/2006 | Do et al. | | |
| 2007/0067222 | A1 | | 3/2007 | Godsey et al. | | |

OTHER PUBLICATIONS

ISA United States, International Search Report of PCT/US2008/07133, Aug. 7, 2008, 3 pages.
U.S. Appl. No. 60/942,652, filed Jun. 7, 2007, Sorensen et al.

* cited by examiner

*Primary Examiner* — Brent Swarthout
(74) *Attorney, Agent, or Firm* — Alleman Hall McCoy Russell & Tuttle LLP (57) ABSTRACT

A traffic and population counting device system and method is provided. The traffic and population counting device may be executable by a computing device and may include an entry selector configured to be selected to indicate that a shopper has entered a shopping zone and to keep a running count of a number of shoppers who enter the shopping zone. An exit selector may be configured to be selected to indicate that a shopper has exited a shopping zone and to keep a running count of a number of shoppers who exit the shopping zone. Further, a display may be configured to display a running population count of shoppers within the shopping zone. The running population count may be determined by a running difference between the running count of the number of shoppers who enter the shopping zone and the running count of the number of shoppers who exit the shopping zone.

14 Claims, 5 Drawing Sheets

TRAFFIC AND POPULATION COUNTING DEVICE SYSTEM AND METHOD

CROSS-REFERENCE TO RELATED APPLICATION

This application claims priority under 35 U.S.C. §119 to U.S. provisional patent application Ser. No. 60/942,652, entitled TRAFFIC AND POPULATION COUNTING DEVICE, filed on Jun. 7, 2007, the entire disclosure of which is herein incorporated by reference.

TECHNICAL FIELD

The present invention relates generally to a system and method to determine traffic and population in a designated area, and more particularly to a shopper traffic and population counting system and method.

BACKGROUND

Understanding the behavior of shoppers in a retail store may be useful to producers and suppliers of the products on the display shelves, and may also be useful to the retail store owners who would like to maximize sales. Purchases may be a function of how many shoppers pass though a particular region, or zone of the store, and may also be a function of how much time a shopper spends within a zone. The actions of shoppers while in a particular zone may also be useful, for example, whether or not a shopper just passes through a zone; whether or not a shopper picks up and/or inspects a product; and/or whether or not, a shopper places a product in a shopping cart. How many of each of these actions takes place within a particular zone may also be useful information. Efforts to understand shopper behavior may include observation and note taking by shopper auditors, or electronic tracking. However, the note taking method can be inaccurate and cumbersome, and the electronic tracking method may be complex and expensive, thereby frustrating efforts to simply, accurately, and inexpensively collect information about shopper behavior.

SUMMARY

A traffic and population counting device system and method is provided. The traffic and population counting device may be executable by a computing device and may include an entry selector configured to be selected to indicate that a shopper has entered a shopping zone and to keep a running count of a number of shoppers who enter the shopping zone. An exit selector may be configured to be selected to indicate that a shopper has exited a shopping zone and to keep a running count of a number of shoppers who exit the shopping zone. Further, a display may be configured to display a running population count of shoppers within the shopping zone. The running population count may be determined by a running difference between the running count of the number of shoppers who enter the shopping zone and the running count of the number of shoppers who exit the shopping zone.

Selection by the entry selector may cause an absolute entry time to be saved by a memory each time a customer enters the shopping zone, and selection by the exit selector may cause an absolute exit time to be saved by the memory each time a customer exits the shopping zone, and wherein a total dwell time is calculated and saved in the memory by subtracting a sum of all the absolute entry times from a sum of all the absolute exit times.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF THE PREFERRED EMBODIMENTS

Figure 1:
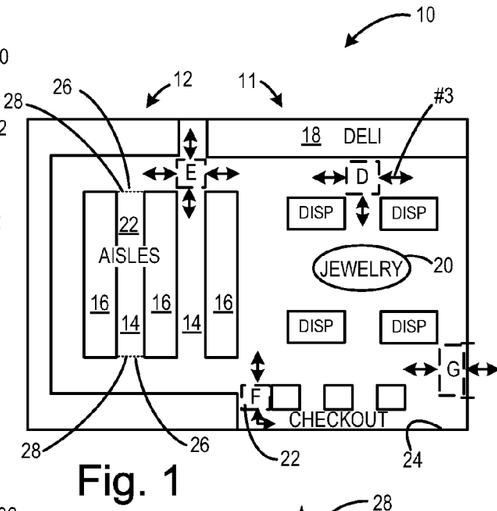
FIG. 1 is a schematic diagram illustrating an example layout of shopping area in a retail store.

FIG. 1 is a schematic diagram illustrating an example layout of shopping areas 10 in a retail store where a traffic and population counting device of this present disclosure may be used. It should be appreciated that the traffic and population counting device of this disclosure may be used in any area where traffic and population counting is desired. As shown in FIG. 1, the store may include open shopping areas 11, and aisle sections 12. The aisle sections 12 may include a number of aisles 14 divided by display cases 16. Open areas 11 may include areas such as a deli counter 18, a jewelry department 20, service areas and other areas.

All or portions of the store may be divided up into various shopping zones 22. The shopping zones 22 may be defined by a combination of physical boundaries such as walls 24 and the display cases 16, and by nonphysical boundaries such as an end of an aisle 26, or the extent of a particular product display, or group of products on display for shoppers. The nonphysical boundaries may be determined by shopper auditors, or others, who may seek to, for example, count or monitor the traffic into and out of a shopping zone 22 of a particular configuration; and/or count the population within a shopping zone 22; and/or observe shopper behavior; and/or capture shopper behavior data within one or more shopping zones 22.

FIGS. 2a, 2b, 2c, and 2d are schematic diagrams illustrating example shopping zones 22 that may be in one or more stores. Each of the shopping zones 22 illustrated may include one or more thresholds 28 that may provide access into and out of the various shopping zones 22. The thresholds 28, may be either virtual or actual, and may be defined at, for example, one or more of the nonphysical boundaries of the various shopping zones 18.

Figure 2A:
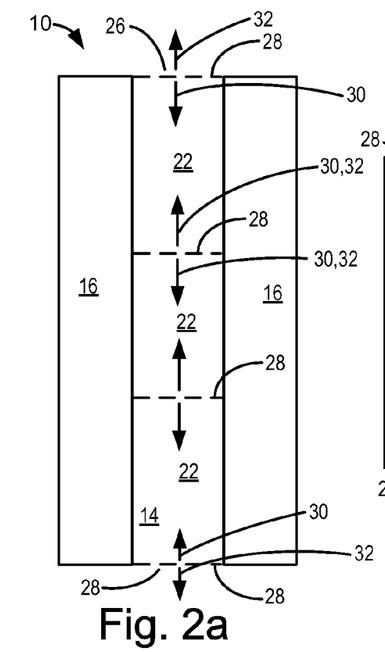
FIGS. 2a, 2b, 2c, and 2d are schematic diagrams illustrating example layouts of shopping zones that may be located in one or more shopping areas in a retail store.

FIG. 2a illustrates an aisle 14 shopping area 10 that has been divided into three shopping zones 22 with two thresholds 28 located within the aisle defining a middle shopping zone 22. Two thresholds 28 at the ends of the aisle 26 define respective two other shopping zones 22. The locations of the thresholds 28 in the middle of the aisles may be determined using various criteria. Without limitation, the criteria may include product type within the shopping zone 22, lighting within the shopping zone 22, colors of the products within the shopping zone 22, the presence of absence of advertising within the shopping zone 22, the location of the shopping zone 22, distance from the end of the aisle 26, etc. Shoppers may enter and exit each shopping zone 22 across two thresholds 28 as indicted by respective in arrows 30 and out arrows 32. In some cases an out arrow 32 for one shopping zone 22 may be an in arrow 30 for an adjacent shopping zone 22.

Figure 2B:
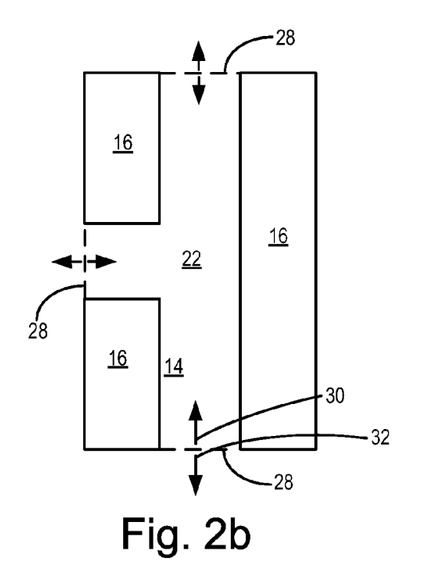
Figure 2C:
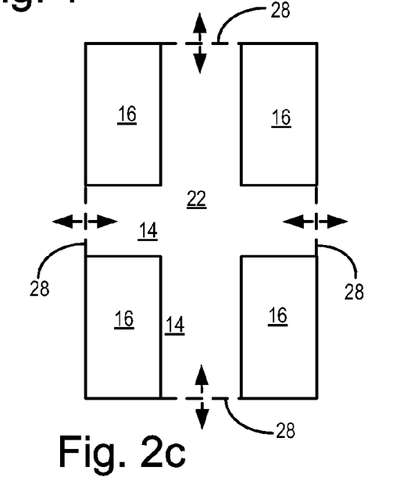
Figure 2D:
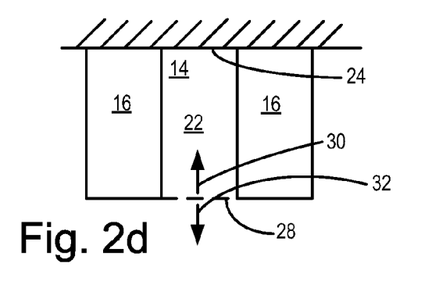

FIG. 2b illustrates a shopping zone 22 having three entries and exits at respective three thresholds 28. FIG. 2c illustrates a shopping zone 22 having four entries and exits at respective four thresholds 28. FIG. 2d illustrates a shopping zone 22 having just one entry and exit at threshold 28. Other configurations are possible. Each threshold 28 may include an in arrow 30 and an out arrow 32 indicating traffic flow respectively into and out of a shopping zone 22.

Figure 3:
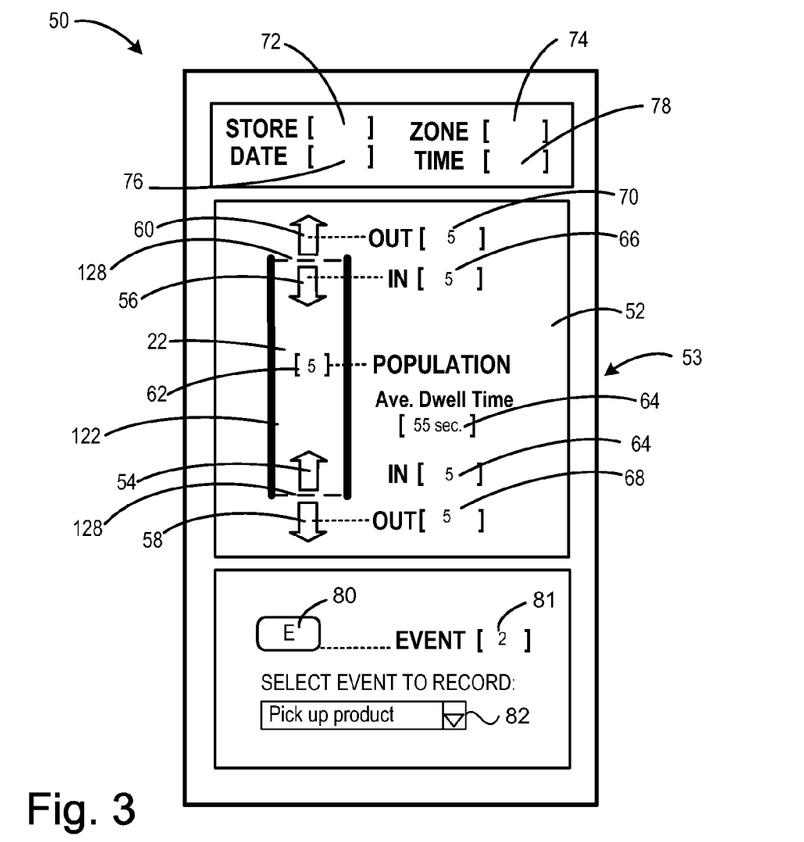
FIG. 3 depicts an example embodiment of shopper traffic and population counting device.

FIG. 3 illustrates an example embodiment of a shopper traffic and population counting device 50. Device 50 may be used to count traffic and population in various shopping zones 22 such as those illustrated in FIG. 1, and FIGS. 2a through 2d. In some embodiments, traffic and population counting device 50 may be a handheld device operated by a person, such as, for example, an auditor. Embodiments of the device 50 may be included in a computing device such as Personal Digital Assistant (PDA), or laptop computer, or the like. In some embodiments the device 50 may be a stand alone device that may include custom or semi-custom circuitry, software, and other features configured to perform the functions described in the current disclosure.

The traffic and population counting device 50 may also include a display 52 that may be configured to display a graphical user interface GUI 53. The GUI 53 may include input and output graphical elements that a user may use to interact with the device 50. The GUI 53 may include a shopping zone graphical element 122 that may be configured to graphically represent a particular actual shopping zone 22. The shopping zone graphical element 122 may be configured in the shape of a floor plan type graphic that may correspond to the actual floor plan of the shopping zone 22. This may aid the auditor when inputting information into the device 50. The shopping zone graphical element 122 may also include threshold elements 128 representing the entry and exit points into and out of the shopping zone 22.

The traffic and population counting device 50 may also include a plurality of actuators, or buttons, configured to input data such as a number of shoppers entering and exiting a shopping zone 22. In some embodiments, each press or click of a button may be processed as one count of a person entering or exiting a shopping zone 22. In the depicted embodiment, actuators are illustrated positioned at the threshold elements 128 of the shopping zone graphical element 122. The actuators may be configured to be in shapes of arrows. For example, arrows 54 and 56 may indicate that shoppers enter shopping zone 22 and arrows 58 and 60 may indicate that the shoppers exit shopping zone 22. The auditor may selectively press an arrow as the auditor sees a shopper moving in and out of shopping zone 22 based on the direction of the shopper's route across the threshold 28. For example, the auditor may simply press corresponding arrows 54 or 56 each time a shopper enters shopping zone 22 from one direction and similarly press corresponding arrows 58 or 60 each time the shopper leaves the shopping zone 22 from one direction.

The use of arrows may facilitate the operation of device 50 by the auditor. Thus, it will be appreciated that the depicted arrows serve as a pair of directional entry and exit selectors for indicating whether a person has entered or exited a zone, and from what direction such exit or entry has occurred. It will be appreciated that these selectors may be either soft buttons displayed by the GUI 53 of the device 50, or hard buttons physically located on the device. Where soft buttons are used, it will appreciated that touch sensitive screen having touch selectors may be employed as described above, and/or a non-touch sensitive screen may be utilized and a user input device such as mouse or keyboard may be used to select the directional entry and exit selectors.

In some embodiments, the number of shoppers who have entered and who have exited a shopping zone 22 may be displayed by the GUI 53. For example, people-in-fields 64, 66 and people-out fields 68 and 70 may be displayed adjacent to arrows 54, 56, 58, and 60, respectively to indicate shoppers traveling in and out in corresponding directions, which indicate the traffic through the shopping zone 22.

The traffic and population counting device 50 may also include a computing device such as a processor. The processor may process each click of arrows 54 or 56 as one count and accumulate each count to determine a running total of shoppers entering shopping zone 22. Similarly, the processor may process each click of arrows 58 or 60 as one count and accumulate each count to determine a running total of shopper exiting shopping zone 22. Thus, a population in the predefined period can be computed as a difference between the running total of shoppers entering the shopping zone and the running total of shoppers exiting the shopping zone.

A computed population may be displayed on a population field 62 on shopping zone 22 of GUI 53 as shown in FIG. 3. The displayed total population allows the auditor to cross check entries and exits by noting the number of people who are actually in shopping zone 22 through visual inspection of the shopping zone 22. For example, if population field 62 indicates three people in population filed 62 while the auditor can see only two people in shopping zone 22, the auditor may realize that an exit button or an arrow needs an additional press in order to bring the number computed by the traffic and population counting device 50 into harmony with the actual population. In this way, traffic and population counting device 50 may provide a continuous feedback to assist the auditor such that the highest level of accuracy can be achieved for a human auditor.

Traffic and population counting device 50 may also include one or more event selectors 80 for recording shopping events. For example, event selector 80 may be actuated to record shopping events such as purchase, package inspection, etc. The event selector 80 may be a hard button on the device, soft button implemented on the GUI 53 of the device 50, a hyperlink, or other suitable form of selector, and may be individually programmable via a pull down menu 82 or other function assigning mechanism, to represent one of a variety of shopping events, such as picking up a product, placing product in a cart, pausing to look at a product on a display, returning a product to a display, etc. An event field 81 may be provided to display a running total of events recorded via the event selector 80.

The GUI 53 may also include input mechanisms for inputting and displaying related information, such as store code, zone number, date, and time. This information may be inputted and displayed via device 50 on a respective store field 72, zone number field 74, date field 76, and time field 78 on display 52.

Traffic and population counting device 50 may be further configured to determine a time when shoppers enter and exit shopping zone 22. For example, a press of an arrow serving as entry selector 54 or or an arrow serving as exit selector 56 may trigger a recording of a shopper's enter time to the shopping zone 22, and a press of arrow 58 or 60 may trigger a recording of a shopper's exit time from the shopping zone 22. The times may respectively be an absolute entry time and an absolute exit time. Each absolute time may be saved by a memory each time a customer enters the shopping zone. The recordation of enter time and exit time of shoppers may enable a determination of total time that the population spends in shopping zone 22 or dwell time of the population. In one embodiment, the total dwell time may be calculated to be a sum of differences between the enter times and the exit times of individual shoppers using the following equation:

$$\text{TOTAL DWELL TIME} = \frac{\sum_{i=1}^{n}(T_{OUTi} - T_{INi})}{n}$$

wherein n is the population or the number of shoppers in the shopping zone; $T_{in}$ is the time that a shopper enters the shopping zone; $T_{out}$ is the time that a shopper exits the shopping zone; and $(T_{out}-T_{in})$ is an estimated dwell time for an individual shopper. Subscripts 1 to n represent a sequence of enter and exit times recorded. It should be noted that a first shopper entering the zone may not exit the zone first. However, the total dwell time can be determined as indicated above without knowing the sequence of shoppers exiting the zone. Thus, an average dwell time of the individual shoppers can be determined by the following equation:

Average dwell time=total dwell time of the population/number of shoppers who have entered the shopping zone 22 during the audit period.

The average dwell time may be most valuable for assessing shopper behavior because it relates to the probability of shopping as distinct from simple transiting and it may ultimately indicate a purchase being made.

The raw data and processed data may be stored in device 50 for later uses such as uses for store management and market analysis. Alternatively, data may be transmitted to a data analysis center to be analyzed separately or in combination with data from other sources.

Figure 4A:
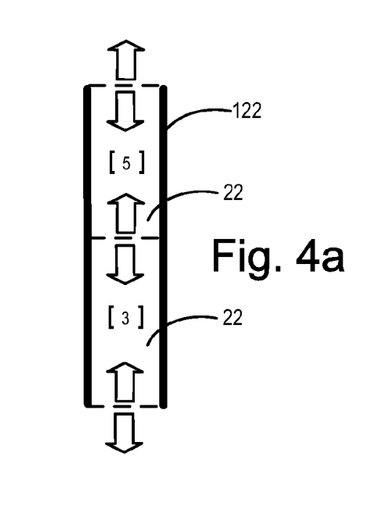
FIGS. 4a and 4b illustrate examples of shopping zone graphical elements that may be displayed by the shopper traffic and population counting device.
Figure 4B:
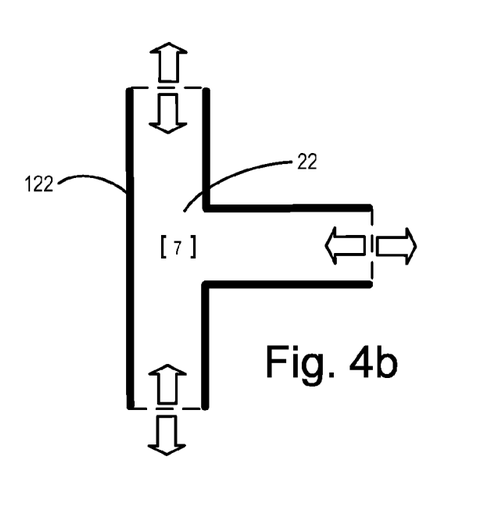

FIGS. 4a and 4b illustrate alternative examples of shopping zone graphical elements 122 that may be displayed by the GUI 53. FIGS. 4a and 4b illustrate just two situations, where the GUI 53 may be configured with a number of pairs of directional exit and entry buttons that corresponds to the number of actual entrances/exits to the shopping zone 22 under analysis. Each shopping zone graphical element 122 may be configured in the shape of a floor plan type graphic that may correspond to the actual floor plan of the shopping zone 22. It will be appreciated that many alternative configurations may exist for use in analyzing shopping zones 22 having various numbers of entry and exit points. When the device, system and method are implemented in open areas, the traffic and population counting device may be configured to include multiple actuators such as arrows to track the entry and exit of people from multiple directions.

Figure 5:
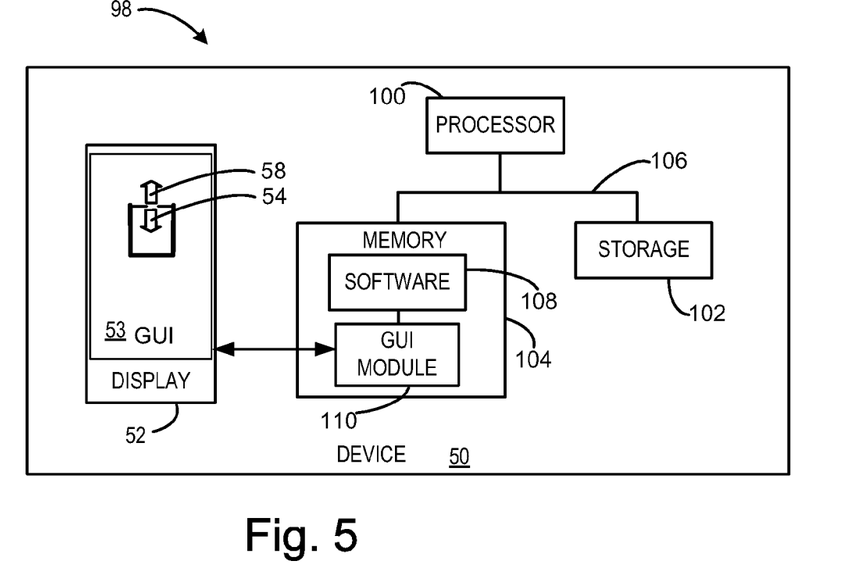
FIG. 5 is a schematic view illustrating a system in accordance with various embodiments.

FIG. 5 is a schematic view illustrating an example system 98 in accordance with various embodiments. The traffic and population counting device 50 may also include a computing device such as processor 100 operatively coupled to a storage 102 and a memory 104, and configured to provide overall system and processing control via a bus 106 or like mechanism interconnecting the various components of the device. The memory 104 may include software 108 configured to be executed by the processor 100. The processor may be configured to control the GUI 53 via a GUI module 110.

The system 98 may be configured for counting shoppers and may include the computer software 108 which, upon execution by the computing device 50 may be configured to display the graphical user interface 53. The graphical user interface 53 may be configured to display a pair of directional entry and exit selectors. The entry selector may be displayed on the graphical user interface as a first arrow pointing into the shopping zone graphical element, and the exit selector may be displayed as a second arrow pointing out of the shopping zone graphical element, as shown in FIG. 3. In FIG. 3, arrows 54, 56 serve as entry selectors and arrows 58, 60 serve as exit selectors. Each entry selector and each exit selector may be configured to respectively represent an entrance of a shopper into a shopping zone 22 and an exit of the shopper, or another shopper, out of the shopping zone 22. The entry selector may be selectable to effect an incrementing running count of a population in the shopping zone 22. The exit selector may be selectable to effect a decrementing running count of the population in the shopping zone.

Further, it should be appreciated that the method and system may be automated without operation by the auditor. For example, a light sensor may be coupled with an electronic traffic and population counting device to detect the entry and exit of people to a designated area, which in turn may actuate counting of the people and/or tracking of the shoppers' enter time and exit time. In this way, population in the designated area and average dwell time of the population in the designated area may be determined. Further, the electronic counter may be configured to provide feedback control on population determination as described above. The feedback control may be achieved as the traffic (i.e., people entering or exiting the area) and population count are independently measured.

Figure 9:
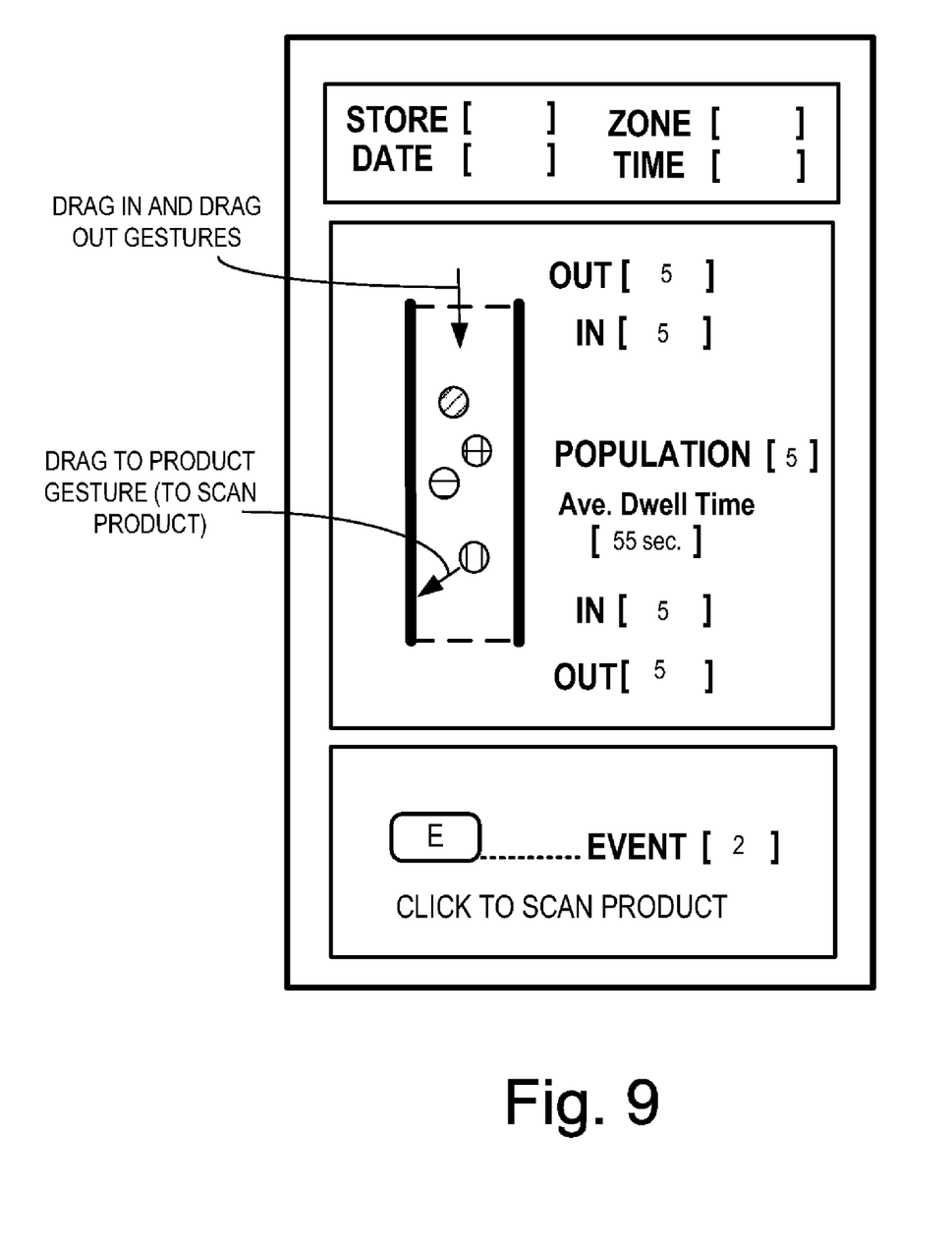
FIG. 9 depicts another example embodiment of shopper traffic and population counting device.

FIG. 9 illustrates an alternative embodiment of the embodiment of shopper traffic and population counting device, in which a gesture based interface is provided. A user may make a drag in gesture or drag out gesture on a touch sensitive screen of the device with a stylus, for example. The drag in gesture or drag out gesture typically cross one of the entries to a shopping zone under observation. As a result, the running population count in the shopping zone is altered. Persons in the shopping zone are represented by graphically distinguishable icons (dots in the depicted example) on the graphical user interface, which appear with drag in gestures, and disappear as they are dragged out of the zone. In this manner, the user may keep a count of the dwell time for each individual shopper in the zone, by selecting an appropriate icon to drag out of the zone when the person leaves the shopping area. To record a shopping event, an user may drag a graphical icon representing the person to a side of the shopping zone or other predetermined location, and the device may be configured to scan a product code representing a product picked up for purchase, for example. Alternatively, the drag operations described herein may be another type of gesture, such as one or more taps, etc. In this manner, data may be efficiently entered.

Figure 6:
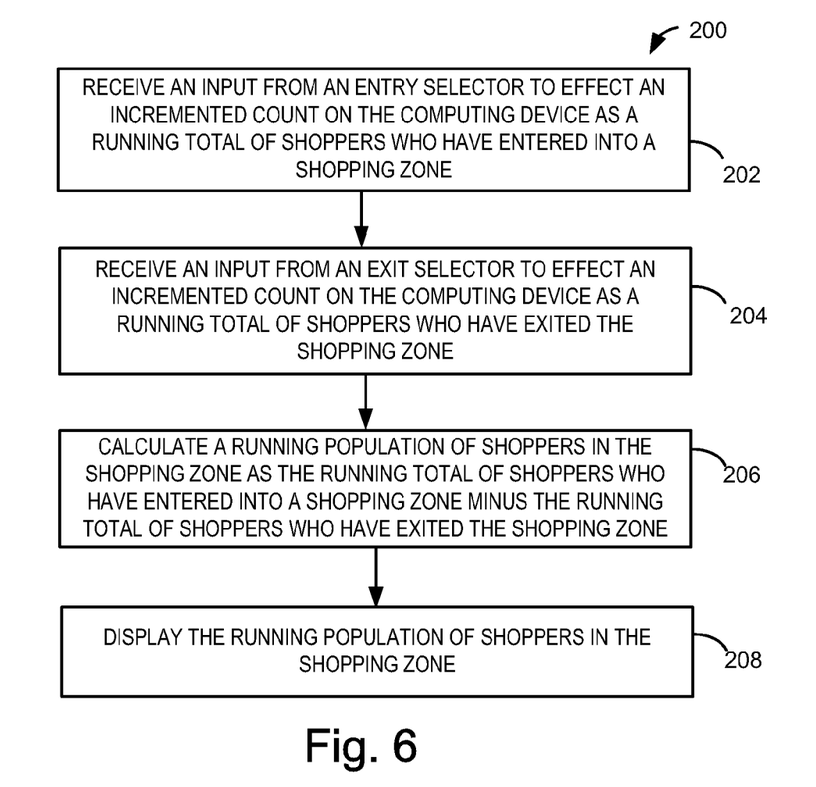
FIGS. 6-8 are flowcharts illustrating various embodiments of a method for counting traffic and a population of shoppers.

FIG. 6 is a flowchart illustrating a method 200 a method for counting traffic and a population of shoppers. The method 200 may be a computer enabled method. The method 200 may include, at 202, receiving an input from an entry selector to effect an incremented count on the computing device as a running total of shoppers who have entered into a shopping zone. The method 200 may include, at 204 receiving an input from an exit selector to effect an incremented count on the computing device as a running total of shoppers who have exited the shopping zone. The method 200 may also include, at 206, calculating a running population of shoppers in the shopping zone as the running total of shoppers who have entered into a shopping zone minus the running total of shoppers who have exited the shopping zone. The method 200 may also include, at 208, displaying the running population of shoppers in the shopping zone.

Figure 7:
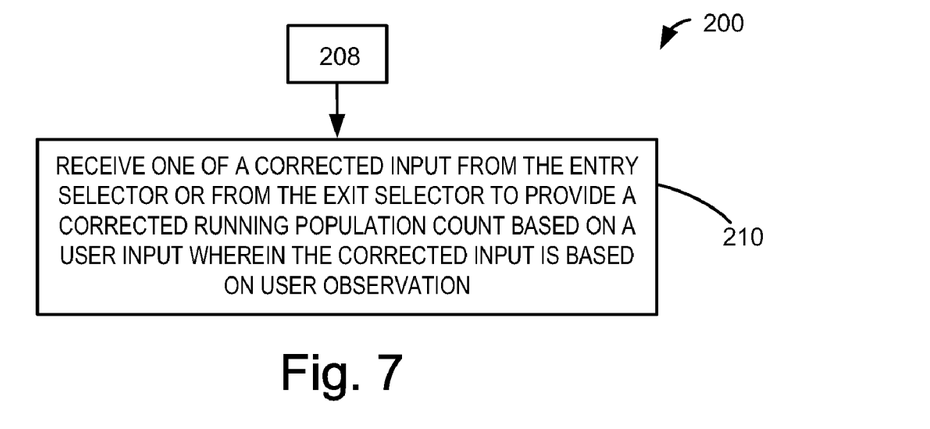

FIG. 7 is a flowchart illustrating variations of the method 200. The method 200 may optionally include, at 210, receiving one of a corrected input from the entry selector or from the exit selector to provide a corrected running population count based on a user input wherein the corrected input is based on user observation.

Figure 8:
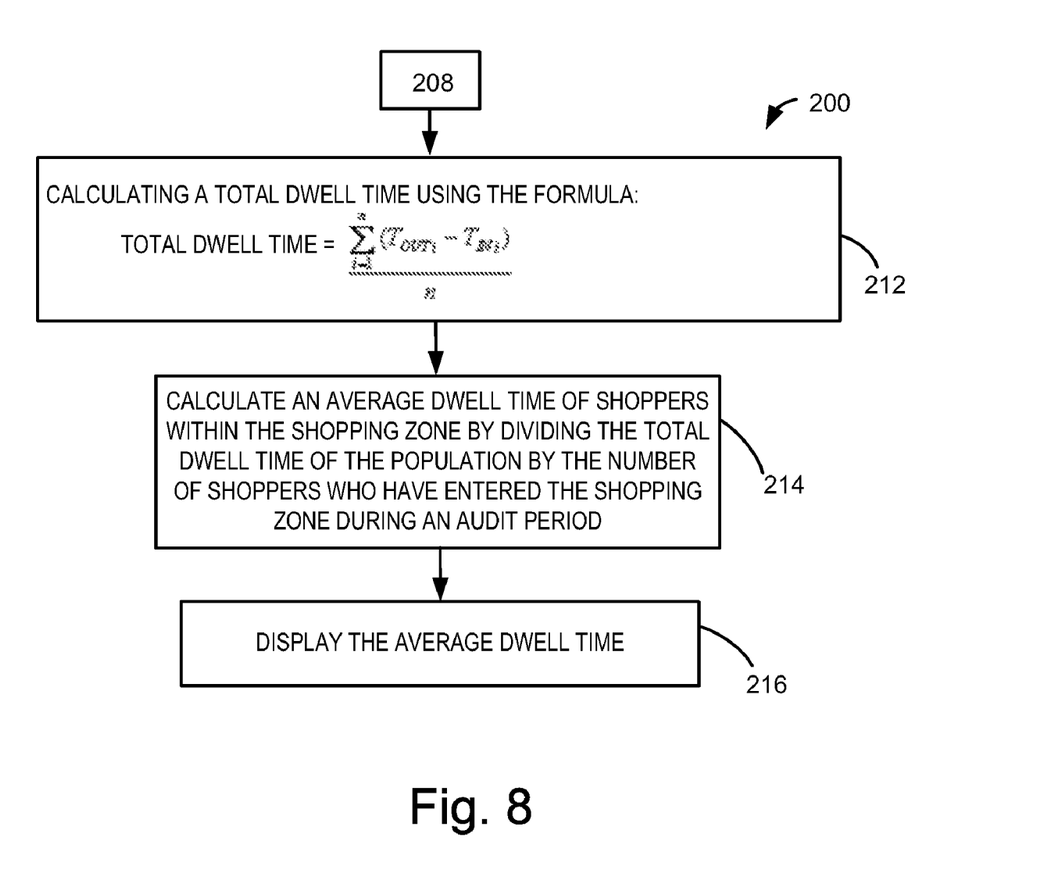

FIG. 8 is a flowchart illustrating variations of the method 200. The method 200 may optionally include, at 212, calculating a total dwell time using the formula:

$$\text{TOTAL DWELL TIME} = \frac{\sum_{i=1}^{n}(T_{OUTi} - T_{INi})}{n},$$

where n is the population or the number of shoppers in the shopping zone, $T_{in}$ is the time that a shopper enters the shopping zone, $T_{out}$ is the time that a shopper exits the shopping zone, and subscripts 1 and n represent a sequence of enter and exit times recorded. Then continuing, method 200 may further include, at 214, calculating an average dwell time of shoppers within the shopping zone by dividing the total dwell time of the population by the number of shoppers who have entered the shopping zone during an audit period. Additionally method 200 may also include, at 216, displaying the average dwell time.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A device executable by a computing device for counting shoppers, comprising:
   an entry selector coupled with the computing device configured to be selected to indicate that a shopper has entered a shopping zone and to keep a running count of a number of shoppers who enter the shopping zone, the entry selector displayed as a first arrow pointing into a shopping zone graphical element;
   an exit selector coupled with the computing device configured to be selected to indicate that a shopper has exited a shopping zone and to keep a running count of a number of shoppers who exit the shopping zone, the exit selector displayed as a second arrow pointing out of the shopping zone graphical element; and
   a display configured to display a running population count of shoppers within the shopping zone determined by a running difference between the running count of the number of shoppers who enter the shopping zone and the running count of the number of shoppers who exit the shopping zone, the display further configured to graphically display the shopping zone graphical element configured in a shape of a floor plan type graphic to correspond to an actual floor plan of the shopping zone.

2. The device of claim 1, wherein a selection by the entry selector causes an absolute entry time to be saved by a memory each time a shopper enters the shopping zone, and wherein a selection by the exit selector causes an absolute exit time to be saved by the memory each time a shopper exits the shopping zone, and wherein a total dwell time is calculated and saved in the memory by subtracting a sum of all the absolute entry times from a sum of all the absolute exit times.

3. The device of claim 2, wherein the display is further configured to display an average dwell time that is calculated by dividing the total dwell time by the number of shoppers who enter the shopping zone.

4. The device of claim 2, wherein the display is configured to display the running count of the number of shoppers who enter the shopping zone and the running count of the number of shoppers who exit the shopping zone.

5. A system for counting shoppers, comprising:
   computer software which, upon execution by a computing device is configured to display a graphical user interface, the graphical user interface being configured to display a pair of directional entry and exit selectors, the graphical user interface further configured to graphically display a shopping zone graphical element configured in a shape of a floor plan type graphic to correspond to an actual floor plan of the shopping zone, the entrance selector and the exit selector being configured to respectively represent an entrance of a shopper into a shopping zone and an exit of the shopper, or another shopper, out of the shopping zone, the entry selector being selectable to effect an incrementing running count of a population in the shopping zone, and the exit selector being selectable to effect a decrementing running count of the population in the shopping zone, the entry selector displayed as a first arrow pointing into the shopping zone graphical element, the exit selector displayed as a second arrow pointing out of the shopping zone graphical element.

6. The system of claim 5, wherein the entry selector is further configured to increment a total number of shoppers who have entered the shopping zone and to increment a total number of shoppers who have exited the shopping zone, and the graphical user interface is further configured to display the total number of shoppers who have entered the shopping zone the total number of shoppers who have exited the shopping zone.

7. The system of claim 6, wherein the graphical user interface is configured to display a population of shoppers who are presently in the shopping zone, based on the number of shoppers who have entered the shopping zone minus the total number of shoppers who have exited the shopping zone.

8. The system of claim 5, wherein the graphical user interface is configured to display an average dwell time that individual shoppers stay in the shopping zone.

9. The system of claim 5, wherein the computer software is configured to calculate a total dwell time by using the formula:

$$\text{total dwell time} = \text{TOTAL DWELL TIME} = \frac{\sum_{i=1}^{n}(T_{OUTi} - T_{INi})}{n}$$

wherein subscripts 1 and n represent a sequence of enter and exit times recorded; $Tin_N$ is a time that shopper n enters the shopping zone; and $\text{Tout}_N$ is a time that the shopper n exits the shopping zone.

10. The system of claim 9, wherein the computer software is configured to calculate an average dwell time by dividing the total dwell time by a total number of shoppers who have entered the shopping zone.

11. The system of claim 5, wherein there are two or more thresholds into and out of the shopping zone, and a corresponding pair of directional entry and exit selectors for each respective threshold.

12. The system of claim 5, wherein the shopping zone graphical element includes a threshold element graphically representing access into and out of the shopping zone.

13. A computing device enabled method of counting traffic and a population of shoppers comprising:
receiving an input from an entry selector to effect an incremented count on the computing device as a running total of shoppers who have entered into a shopping zone;
receiving an input from an exit selector to effect an incremented count on the computing device as a running total of shoppers who have exited the shopping zone;
calculating a running population of shoppers in the shopping zone as the running total of shoppers who have entered into the shopping zone minus the running total of shoppers who have exited the shopping zone;
displaying the running population of shoppers in the shopping zone; and
receiving one of a corrected input from the entry selector or from the exit selector to provide a corrected running population count based on a user input wherein the corrected input is based on user observation.

14. The computing device enabled method of claim 13, further comprising:
calculating a total dwell time using the formula:

$$\text{total dwell time} = \text{TOTAL DWELL TIME} = \frac{\sum_{i=1}^{n}(T_{OUTi} - T_{INi})}{n}$$

wherein n is the population or the number of shoppers in the shopping zone, $T_{in}$ is a time that a shopper enters the shopping zone, $T_{out}$ is a time that a shopper exits the shopping zone, and subscripts 1 and n represent a sequence of enter and exit times recorded;
calculating an average dwell time of shoppers within the shopping zone by dividing the total dwell time of the population by the number of shoppers who have entered the shopping zone during an audit period; and
displaying the average dwell time.

* * * * *